United States Patent [19]
Tamura

[11] Patent Number: 4,874,239
[45] Date of Patent: Oct. 17, 1989

[54] DISTANCE MEASURING DEVICE

[75] Inventor: Shuichi Tamura, Kanagawa, Japan

[73] Assignee: Canon Kabushiki Kaisha, Tokyo, Japan

[21] Appl. No.: 171,151

[22] Filed: Mar. 21, 1988

Related U.S. Application Data

[63] Continuation of Ser. No. 31,158, Mar. 25, 1987, abandoned, which is a continuation of Ser. No. 636,590, Aug. 1, 1984, abandoned.

[30] Foreign Application Priority Data

Aug. 10, 1983 [JP] Japan ................................ 58-145068

[51] Int. Cl.$^4$ .......................... G01C 3/08; G03B 3/00
[52] U.S. Cl. ....................................... 356/4; 250/201; 354/403; 356/1; 356/5
[58] Field of Search ....................... 354/403; 356/1, 4; 250/201 AF

[56] References Cited

U.S. PATENT DOCUMENTS

| | | | |
|---|---|---|---|
| 2,786,096 | 3/1957 | Palmer | 356/1 |
| 3,999,192 | 12/1976 | Hosoe et al. | 354/403 |
| 4,371,261 | 2/1983 | Tsuji | 356/4 |
| 4,469,939 | 9/1984 | Utagawa | 354/403 |
| 4,470,681 | 9/1984 | Johnson | 354/403 |
| 4,511,245 | 4/1985 | Abbas | 356/1 |
| 4,514,084 | 4/1985 | Makino et al. | 356/4 |

Primary Examiner—Stephen C. Buczinski
Attorney, Agent, or Firm—Fitzpatrick, Cella, Harper & Scinto

[57] ABSTRACT

In a distance measuring device for measuring distance to an object by projecting a light beam onto the object and receiving the reflected light therefrom, the light beam to be projected onto the object is divided into a plurality of directions by a reflecting system so that a plurality of object distances can be measured at the same time.

48 Claims, 4 Drawing Sheets

DISTANCE MEASURING DEVICE

This application is a continuation of application Ser. No. 031,158 filed Mar. 25, 1987, now abandoned, which was a continuation of application Ser. No. 636,590 filed Aug. 1, 1984, now abandoned.

BACKGROUND OF THE INVENTION

1. Field of the Invention:

This invention relates to distance measuring devices and more particularly to distance measuring devices capable of measuring a plurality of objects distances at the same time.

2. Description of the Prior Art:

In the art of distance measuring devices of this type, it has been proposed to employ a plurality of light emitting elements along with the corresponding number of light receiving elements as, for example, disclosed in U.S. patent application Ser. No. 577,089 filed Feb. 6, 1984, or to construct the projection lens in a form having a plurality of optical axes, or of a so-called ommateal lens as disclosed in U.S. Pat. No. 4,371,261. However, the former, because of its having a plurality of elements, calls for a large increase in the bulk and size of the device, and, therefore, is very disadvantageous from the standpoint of space and cost, making it difficult to be put into practice. The latter, because of its use of the lens in divided areas, requires either that the lens be increased in size or that if the lens is greatly small, the output of the light emitting element is increased to a large extent to compensate for the reduction of the amount of light transmitted through the lens. This also was very difficult to put into practical use.

A first object of the present invention is to eliminate the above-described drawbacks of the conventional device and to provide a distance measuring device in which a light beam is projected onto an object, and its reflection is received to measure the distance to the object, whereby the light beam to be projected onto the object is divided into a plurality of directions by a reflecting system, so that with a very simple and compact structure a plurality of object distances can feasibly be measured at one time.

Other objects of the invention will become apparent from the following detailed description of embodiments thereof.

SUMMARY OF THE INVENTION

A distance measuring device in which by projecting a light bundle onto an object and receiving the reflected light bundle therefrom, the angle formed by the projected light bundle to the object and the reflected light bundle is evaluated to measure the distance to the object. The apparatus includes light projecting means for projecting a light bundle onto the object, a reflection system for reflecting the light bundle from the light projecting means so that the light bundle is projected in divided portions onto objects other than the object, and light receiving means for receiving the reflected light of the light bundle.

BRIEF DESCRIPTION OF THE DRAWINGS

The drawings illustrate embodiments of the distance measuring device according to the present invention, in which:

FIG. 7($b$) is an axial section view of the light receiving optical system of FIG. 6.

DETAILED DESCRIPTION OF THE PREFERRED EMBODIMENTS

The present invention will next be described in detail in connection with embodiments thereof by reference to the drawings.

Figure 1:
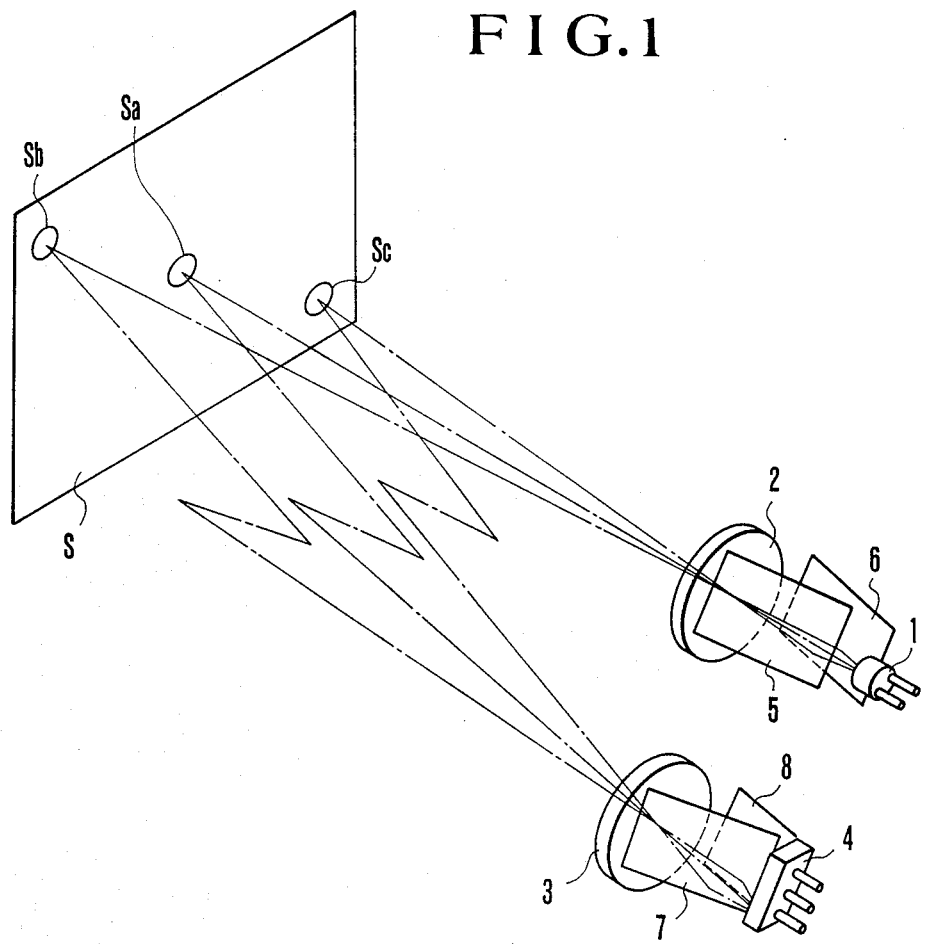
FIG. 1 is a schematic perspective view of the device.
Figure 2:
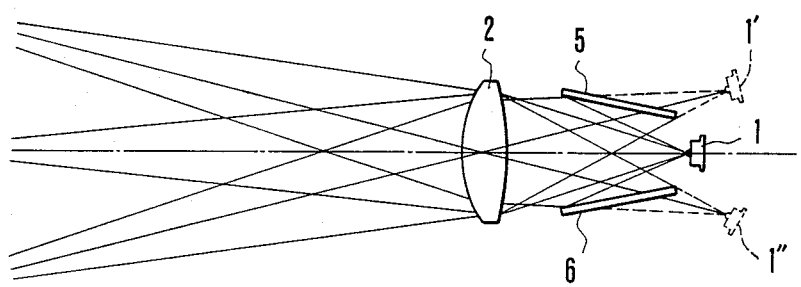
FIG. 2 is a longitudinal section view of the light projecting optical system of the device of FIG. 1.

FIG. 1 illustrates the construction and arrangement of the main parts of an embodiment of the distance measuring device according to the present invention. A light source 1, for example, a light emitting diode for producing near infrared light, and a projection lens 2 for projecting the light from the light source 1 onto an object S to be photographed constitute a light projecting optical system. A collection lens 3 for focusing light radiating from an image of the light source on the surface of the object S and a photosensitive element 4 receiving the light from the collection lens 3 at a position, depending on the object distance, constitute a light receiving optical system. The device of the invention is similar to the prior art in the provision of such light projecting and receiving optical systems. Note, in this embodiment, the photosensitive element 4 makers use of a semiconductor position detector having two output lines at which photo-currents appear in a variable ratio of intensity, depending on the position of a point of incidence of light thereon. From the variation of the ratio of the two output photo-signals, distance information is obtained by a processing circuit which is described in detail, for example, in Japanese Laid-Open Patent Application No. SHO 57-44809. It is explained hereafter, Arranged adjacent to an optical path connecting the light source 1 with the projection lens 2 are reflection mirrors 5 and 6 so that a light bundle from the light source 1 is projected to particular points on the object S. In more detail, as shown in FIG. 2, in the light projecting optical system, a portion of the light bundle emanating from the light source 1 is reflected by the reflection mirror 5 if the light source 1 were at a position indicated by 1', and another portion of the light bundle is reflected by the reflection mirror 6 if the light source 1 were at a position indicated by 1''.

Therefore, formed on the object plane S are an image Sa with the light bundle from the light source 1 converged directly by the projection lens 2, another image Sc with the light bundle from the light source 1 reflected from the reflection mirror 5 and then converged by the projection lens 2 and still another image Sb with the light bundle from the light source 1 reflected from the reflection mirror 6 and then converged by the projection lens 2.

Meanwhile, also adjacent to the optical path connecting the collection lens 3 and the photosensitive element 4 are reflection mirrors 7 and 8 arranged in a similar manner so that a light bundle from the image Sc on the object is reflected by the reflection mirror 7, and another light bundle from the image Sb is reflected by the reflection mirror 8. The respective bundles are superimposed on a light bundle from the image Sa before these three light bundles impinge on the photosensitive element 4. This relation is the same as when, in the light projecting optical system of FIG. 2, the photosensitive element 4 is arranged in the position of the light source 1, and the direction in which the light bundle advances is reversed.

In short, the projected light image of the light source 1 is separated into a plurality of projected images Sa, Sb, Sc, and, in these places, respective distance measurings are performed. By summing up these results, distance information is obtained. In this case, if the images Sa, Sb and Sc on the object S are all at equal distances the light source images on the photosensitive element 4 concentrate at one point at which the relative position depends on the object distance, and its position is produced as distance information. But when the distances to the positions of formation of the images Sa, Sb and Sc are different from one another, the light source images on the photosensitive element 4 take different positions depending on the respective distances so that the photosensitive element 4 produces an output representing the weighting mean value of the respective light source images Sa, Sb, and Sc as distance information.

Therefore, though, when the measured distances of the plurality of the objects portions are different, the distance measuring result varies depending on the reflection and relative position of the object S, because the light intensity of the signal is inversely proportional to the square of the objects distance, a greater emphasis is laid on the measurement of the shorter objects distance. As a result, it is well conformed with the characteristic of the photographic lens which is shallow in the close up field depth and deep in the far field depth, giving the advantage of obtaining a very favorable result.

Figure 3:
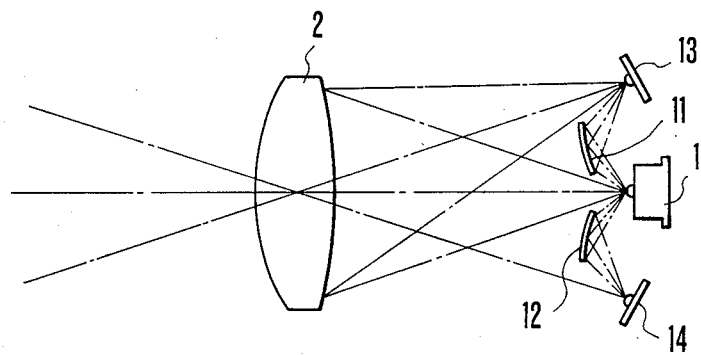
FIG. 3 illustrates another embodiment of the light projecting optical system of the device of FIG. 1.

FIG. 3 illustrates an improved embodiment of the light projecting optical system of the device of FIG. 1, wherein two aspherical concave mirrors 11 and 12 are arranged symmetrically with respect to the optical path connecting the light source 1 and the projection lens 2 so that the light from the light source 1, after being reflected from respective concave mirrors 11 and 12, focuses on respective reflection mirrors 13 and 14. By the use of such a construction and arrangement, as compared with the light projecting optical system of FIG. 2, the concave mirrors 11 and 12 can be arranged closer to that part of the light from the light source 1 which directly enters the projection lens 2, thereby, advantageously, the light bundle from the light source 1 is efficiently used without further wasteful consumption. Another advantage is that by once focusing the light bundle in the vicinity of the reflection mirrors 13 and 14, imaging of the light source 1 on the object S can be uniform.

Figure 4:
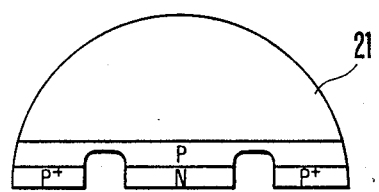
FIG. 4 is a sectional view of the light emitting diode.
Figure 5:
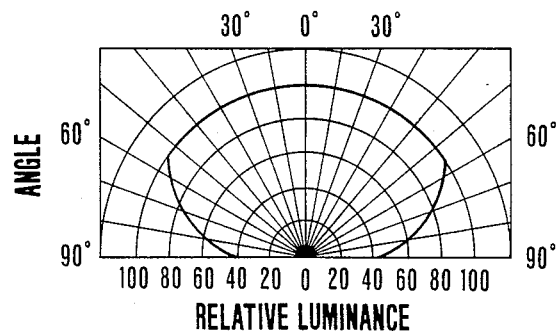
FIG. 5 is a graph illustrating the light emitting characteristics of the diode of FIG. 4.

Note, the light source 1 usable in the present invention is generally a light emitting diode. As the angle of radiation of the light output is to some extent wide, a product which satisfies the requirement is recently sold the market in a light emitting diode 21 of dome shape as shown in FIG. 4. This light emitting diode 21 has a light emitting characteristic shown in FIG. 5. The angle of radiation of the light output of the diode 21 is sufficiently wide. Therefore, it is advantageously used as the light source 1.

Figure 6:
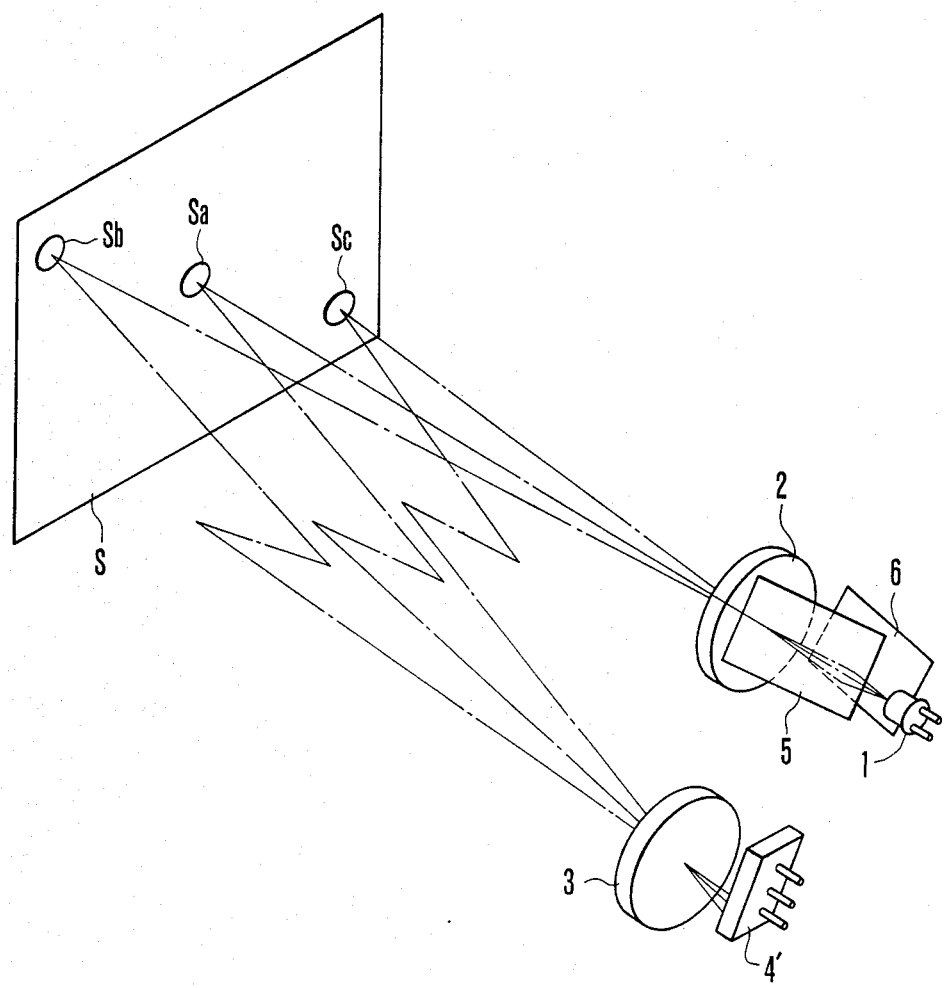
FIG. 6 is a schematic perspective view of another embodiment of the invention.
Figure 7A:
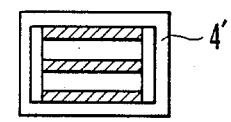
FIG. 7($a$) is a front elevational view of the light receiving element of FIG. 6.
Figure 7B:
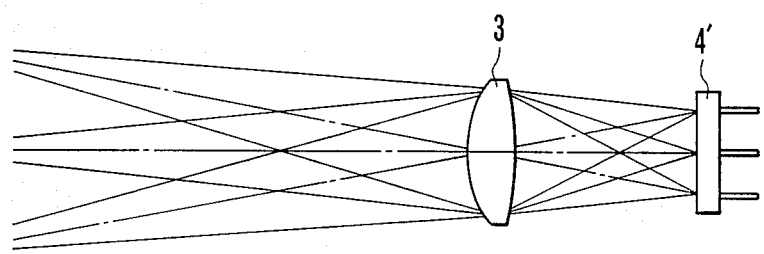

Though the foregoing embodiment has been described in conjunction with the use of two reflection mirrors 13, 14 in both the light projecting optical system and the light receiving optical system, and a total of three separate areas on the object S are measured in distance, the number of reflection mirrors 13, 14 may be increased to three or four. When these three or four mirrors 13, 14 are properly arranged, it is also possible to measure the distances of the four or five objects areas at a time. But the required condition is that the positions of the light source images Sa, Sb, Sc formed on the objects through the reflection mirrors 13, 14 do not overlap the light source image Sa, Sb, Sc formed on the objects without recourse to the reflection mirrors 13, 14 as viewed in the direction of the base line. In other words, it is necessary that the positions of the light source images Sa, Sb, Sc formed through the reflection mirrors 13, 14 do not directly enter the photosensitive element 4. It is also possible to use no reflection mirrors 13, 14 in the light receiving optical system but instead to increase the width of the photosensitive element 4 so that the light bundles from the plurality of light source images Sa, Sb, Sc are directly received. FIG. 6 illustrates the construction of the embodiment applied to such case. A photosensitive element 4' has, as illustrated in FIG. 7(a), three light receiving areas formed in parallel. As shown in FIG. 7(b), the light source images Sa, Sb, Sc enter the respective light receiving areas. Note, the photosensitive element 4' may be one element of a wide width.

Figure 8:
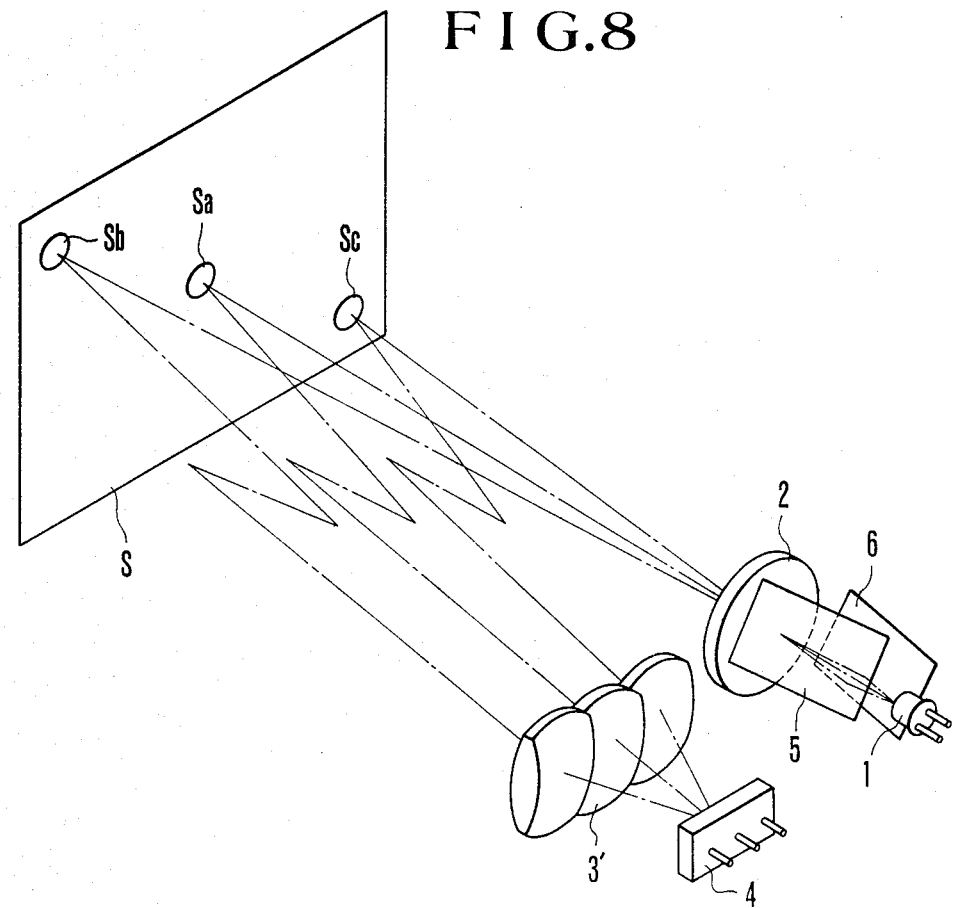
FIG. 8 is a schematic perspective view of still another embodiment of the present invention.

FIG. 8 illustrates still another embodiment where with regard to the light projecting optical system, similar to the embodiment of FIG. 1, the reflection mirrors 5 and 6 are used to project three images Sa, Sb and Sc on the object S. As for the light receiving optical system, a collection lens 3' having three lens portions formed as a unit with their optical axes separate from one another is used to focus the light bundles from the three images Sa, Sb, and Sc on the object S through the respective lens portions onto the photosensitive element 4. In other words, instead of using the reflection mirrors 5, 6 in the light receiving optical system of the embodiment of FIG. 1, the collection lens 3' is otherwise formed with three lens portions of different optical axes to converge the light bundles.

In this embodiment, the number of light bundles projected onto the object S is not limited to three, but three or four reflection mirrors 5, 6 may be used in the light projecting optical system, and the corresponding number of lens portions of different optical axes are provided in the collection lens 3', thereby making it possible to measure the distances of the four or five objects areas at a time. A further increase in the number of objects areas to be measured at a time is possible in principle, but it is required that the positions of the images Sa, Sb, Sc formed through the reflection mirrors 5 and 6 on the object S do not overlap the image Sa, Sb, Sc formed without recourse to the reflection mirrors as viewed in the direction of the base line. In other words, the images Sa, Sb, Sc on the object S must pass through lens portions other than the corresponding lens portions to the photosensitive element 4. In this embodiment, the reflection mirrors 5 and 6 in the light projecting optical system correspond to the respective lens portions in the light receiving optical system so that the layout of the arrangement of the light projecting optical system and the objects areas to be measured has a relatively high degree of freedom and there is great merit to the camera design. Also the use of the reflection mirrors 5, 6 is limited only to the light projecting optical system. In some cases, therefore, there is merit. Further more, instead of the separate reflection mirrors 5, 6, the package of the light emitting diode 21 may have reflection surfaces as a unit therewith. Furthermore, in the embodiments of FIGS. 6 and 8, the arrangements of the light projecting optical system and the light receiving optical system may be replaced by each other. Namely, in the embodiment of FIG. 6, while the light projecting optical system may be provided with a plurality of light sources instead of the reflection mirrors 5 and 6, the light receiving optical system may be provided with reflection mirrors instead of the photosensitive element 4' having a plurality of light receiving areas. And, in the embodiment of FIG. 8, while the light projecting optical system may be provided with the projection lens 2 having three lens portions instead of the reflection mirrors 5 and 6, the light receiving optical system may be provided with reflection mirrors 5, 6 instead of the collection lens 3'.

It is to be understood that according to the present invention, the distance measuring device utilizes that straying portion of the light rays emanating from the light source which has heretofore not been used in the prior art so that with the use of simple means in the form of reflection mirrors 5, 6, 13, 14, a plurality of light bundles are projected onto the object. Therefore, the distance measuring device that obtains distance information about the plurality of different areas on the objects can be constructed in simple and compact form, and its advantage in practical applications is great. Also by the use of the reflection mirrors 13, 14 in combination with the concave mirrors 11, 12, the light output of the light source can be more efficiently utilized, and a result equivalent to that when a large output light source is used is achieved.

What is claimed is:

1. A transmitting/receiving device for projecting a plurality of signal light beams toward a plurality of places on an object and receiving the signal light beams reflected from the object, comprising:
   light emitting means for emitting light;
   reflection means for reflecting a portion of the light emitted from said light emitting means in a non-parallel direction with respect to the unreflected portion of said emitted light;
   a projection member for forming said plurality of signal light beams by converging the unreflected portion of said emitted light toward a first place on the object, and by converging the reflected portion of the emitted light toward a second place on the object, the plurality of formed signal light beams emanating from a common portion of said projection member and being projected respectively to said first and second places; and
   light receiving means for receiving the signal light beams reflected from said object.

2. A device according to claim 1, wherein said light receiving means produces a signal corresponding to the positions on said light receiving means at which said reflected signal light beams are received.

3. A device according to claim 2, wherein said light receiving means produces a plurality of signals, each corresponding to the position on said light receiving means at which associated ones of said reflected signal light beams are received.

4. A device according to claim 2, wherein said light receiving means includes guiding means arranged for guiding said reflected signal light beams toward a single position in said light receiving means when said first and second positions lie at the same distance from said light receiving means.

5. A device according to claim 4, wherein said guiding means includes a plurality of lens systems of different direction of optical axis.

6. A device according to claim 4, wherein said guiding means includes second reflection means for reflecting said reflected signal light beams.

7. A device according to claim 1, wherein said light receiving means has the same number of light receiving parts as the number of projecting directions of said signal light beams.

8. A device according to claim 1, further comprising a concave mirror for directing said emitted light toward said reflection means.

9. A device according to claim 8, wherein said concave mirror is formed to an aspherical surface.

10. A device according to claim 1, wherein said projection member comprises a fixed lens.

11. A device according to claim 1, wherein said light emitting means comprises a single light emitting element.

12. A device according to claim 1, wherein said reflection means comprises a fixed reflection means.

13. A device according to claim 1, wherein said light emitting means includes a light emitting element of dome shape.

14. A transmitting/receiving device for projecting a plurality of signal light beams toward a plurality of places on an object and receiving the signal light beams reflected from the object, comprising:
   light emitting means for emitting light;
   a projection member for forming a first signal light beam by converging an unreflected portion of the emitted light through a portion of said projection member toward a first place on the object;
   reflecting means for forming a second signal light beam, non-parallel with respect to said first signal light beam, by reflecting another portion of the emitted light in a direction different from that of said first signal light beam converging through said portion of said projection member toward a second place on the object; and
   light receiving means for receiving the signal light beams reflected from said object.

15. A device according to claim 14, wherein said light receiving means produces a signal corresponding to the positions on said light receiving means at which said reflected signal light beams are received.

16. A device according to claim 15, wherein said light receiving means includes guiding means arranged for guiding said reflected signal light beams toward a single position in said light receiving means when said first and second positions lie at the same distance from said light receiving means.

17. A device according to claim 16, wherein said guiding means includes second reflection means for reflecting said reflected signal light beams.

18. A device according to claim 15, wherein said light receiving means has the same number of light receiving parts as the number of projecting directions of said signal light beams.

19. A device according to claim 14, further comprising a concave mirror for directing said emitted light toward said reflection means.

20. A device according to claim 19, wherein said concave mirror comprises an aspherical surface.

21. A device according to claim 14, wherein said light emitting means includes a light emitting element of dome shape.

22. A device according to claim 14, wherein said projection member comprises a fixed lens.

23. A device according to claim 14, wherein said light emitting means comprises a single light emitting element.

24. A device according to claim 14, wherein said reflection means comprises fixed reflection means.

25. A device according to claim 14, wherein said guiding means includes:
   a plurality of lens systems of different direction of optical axis.

26. A device for receiving a plurality of non-parallel signal light beams reflected from a plurality of different places on an object, comprising:
   a lens for receiving said plurality of reflected, non-parallel signal light beams from a plurality of different directions, and for passing said plurality of signal light beams through a common portion of said lens;
   reflection means for reflecting a portion of said plurality of signal light beams passed through said lens toward a light receiving means so as to superimpose the reflected light on said light-receiving means; and
   said light receiving means for receiving light directly without reflection passed through said lens and indirectly by reflection passed through said lens.

27. A device according to claim 26, wherein said light receiving means is arranged so as to receive light coming directly from said lens and the reflected light coming indirectly from said reflection means at a common light receiving part.

28. A device according to claim 26, further comprising:
   light emitting means for emitting light;
   second reflection means for reflecting a portion of the emitted light from said light emitting means in a non-parallel direction with respect to the unreflected portion of said emitted light; and
   a projection member for forming said plurality of signal light beams by projecting the unreflected emitted light toward a first place on the object, and by projecting the reflected light toward a second place on the object;
   wherein said plurality of signal light beams emanate from a common portion of said projection member and are projected respectively to said first and second places.

29. A device according to claim 28, wherein said projection member comprises a fixed lens.

30. A device according to claim 29, wherein said lens comprises a fixed lens.

31. A device according to claim 28, wherein said second reflection means comprises fixed reflection means.

32. A device according to claim 26, wherein said lens comprises a fixed lens.

33. A device according to claim 26, further comprising:
   light emitting means for emitting light;
   a projection member for forming a first signal light beam by projecting emitted light through a portion of said projection member toward a first place on the object; and
   second reflection means for forming a second signal light beam by reflecting a portion of the emitted light in a non-parallel direction with respect to said first signal light beam through said portion of said projection member toward a second place on the object.

34. A device according to claim 33, wherein said projection member comprises a fixed lens.

35. A device according to claim 34, wherein said lens comprises a fixed lens.

36. A device according to claim 33, wherein said second reflection means comprises a fixed reflection means.

37. A device according to claim 26, wherein said reflection means comprises fixed reflection means.

38. A device for receiving a plurality of non-parallel signal light beams reflected from a plurality of places on an object, comprising:
   a lens for receiving said plurality of reflected, non-parallel signal light beams from a plurality of different directions, and for passing said plurality of signal light beams through a common portion of said lens;
   reflection means for redirecting some of said plurality of reflected signal light beams which have passed through said lens, and for guiding said redirected light to a light receiving means so as to superimpose the redirected light on said light receiving means; and
   said light receiving means for receiving light directly without reflection passed through said lens and indirectly by reflection passed through said lens.

39. A device according to claim 38, wherein said lens comprises a fixed lens.

40. A device according to claim 38, wherein said second reflection means comprises a fixed reflection means.

41. A device according to claim 38, further comprising:
   light emitting means for emitting light;
   second reflection means for reflecting a portion of the light emitted from said light emitting means, and for directing the reflected light in a direction different from that of the unreflected emitted light; and
   a projection member for forming said plurality of signal light beams by projecting the unreflected emitted light toward a first place on the object, and by projecting said reflected light toward a second place on the object;
   wherein said plurality of signal light beams emanate from a common portion of said projection member and are projected respectively to said first and second places.

42. A device according to claim 41, wherein said projection member comprises a fixed lens.

43. A device according to claim 42, wherein said lens comprises a fixed lens.

44. A device according to claim 41, wherein said second reflection means comprises fixed reflection means.

45. A device according to claim 38, further comprising:
   light emitting means for emitting light;

a projection member for forming a first signal light beam by projecting emitted light through a portion of said projection member toward a first place on the object; and second reflection means for forming a second signal light beam by reflecting a portion of the emitted light in a non-parallel direction with respect to said first signal light beam through said portion of said projection member toward a second place on the object.

46. A device according to claim 45, wherein said projection member comprises a fixed lens.

47. A device according to claim 46, wherein said lens comprises a fixed lens.

48. A device according to claim 41, wherein said second reflection means comprises fixed reflection means.

* * * * *

UNITED STATES PATENT AND TRADEMARK OFFICE
CERTIFICATE OF CORRECTION

PATENT NO. : 4,874,239    Page 1 of 2

DATED : October 17, 1989

INVENTOR(S) : Shuichi Tamura

It is certified that error appears in the above-identified patent and that said Letters Patent is hereby corrected as shown below:

COLUMN 1:

Line 13, "objects" should read --object--.

Line 32, "increased" should read --greatly increased--.

COLUMN 2:

Line 37, "makers" should read --makes--.

Line 46, "hereafter," should read --hereafter.--.

COLUMN 3:

Line 18, "distances" should read --distances,--.

Line 39, "close up" should read --close-up--.

Line 64, "which satisfies the requirement is" should be deleted.

Line 65, "the market in" should read --in the market which satisfies the requirement is--.

UNITED STATES PATENT AND TRADEMARK OFFICE
CERTIFICATE OF CORRECTION

PATENT NO. : 4,874,239
DATED : October 17, 1989
INVENTOR(S) : Shuichi Tamura

It is certified that error appears in the above-identified patent and that said Letters Patent is hereby corrected as shown below:

COLUMN 4:

Line 60, "reflection mirrors" should read --reflection mirrors 5, 6--.

Line 62, "must pass" should read --must not pass--.

COLUMN 6:

Line 47, "converging" should read --and converging--.

Signed and Sealed this

Twenty-sixth Day of March, 1991

Attest:

HARRY F. MANBECK, JR.

*Attesting Officer*      *Commissioner of Patents and Trademarks*